US006176085B1

United States Patent
Kirakos-Shirvanyan

(10) Patent No.: US 6,176,085 B1
(45) Date of Patent: Jan. 23, 2001

(54) HYDRAULIC DRIVE SYSTEM

(76) Inventor: Oganes Kirakos-Shirvanyan, 126 S. Cedar St., #2, Glendale, CA (US) 91205

( * ) Notice: Under 35 U.S.C. 154(b), the term of this patent shall be extended for 0 days.

(21) Appl. No.: 09/327,836

(22) Filed: Jun. 8, 1999

(51) Int. Cl.⁷ ................................................ F16D 31/02
(52) U.S. Cl. ................................. 60/444; 60/486; 60/445
(58) Field of Search ........................... 60/444, 465, 447, 60/486, 445

(56) References Cited

U.S. PATENT DOCUMENTS

| 1,212,655 | * | 1/1917 | Magie et al. | 60/465 |
| 2,743,582 | * | 5/1956 | Wiedmann | 60/444 X |
| 2,807,140 | * | 9/1957 | Tyler | 60/444 X |
| 3,650,108 | * | 3/1972 | Isaac | 60/447 |
| 3,986,357 | * | 10/1976 | Hoffmann | 60/444 X |
| 3,986,358 | * | 10/1976 | Hoffmann | 60/444 X |
| 4,364,230 | * | 12/1982 | Holmes | 60/444 |
| 4,370,856 | * | 2/1983 | Ito et al. | 60/444 X |
| 4,382,360 | * | 5/1983 | Dummer | 60/444 |
| 4,400,939 | * | 8/1983 | Moranduzzo et al. | 60/444 X |
| 4,903,792 | | 2/1990 | Ze-ying . | |
| 5,048,294 | * | 9/1991 | Oshina et al. | 60/444 X |
| 5,613,361 | * | 3/1997 | Dantlgraber et al. | 60/444 X |
| 5,632,221 | | 5/1997 | Trenne et al. . | |
| 5,810,106 | | 9/1998 | McCoy . | |
| 5,847,470 | | 12/1998 | Mitchell . | |
| 5,848,520 | | 12/1998 | Arfstron et al. . | |

* cited by examiner

Primary Examiner—John E. Ryznic
(74) Attorney, Agent, or Firm—Sheldon & Mak

(57) ABSTRACT

A hydraulic drive system includes a variable displacement pump unit having a rotor rotatably supported within a housing on a main rotor axis, and an input shaft coupled to the rotor by mating bevel reduction gears. A main pump includes a plurality of main hydraulic cylinders fixedly supported relative to the housing; a ring member supported by a journal at variable eccentricity; a plurality of pistons sealingly slidable in corresponding ones of the cylinders that are coupled by respective followers to the shaft input by the ring member for reciprocating movement; and inlet and exhaust one-way check valves fluid coupled to each of the cylinders. A hydraulic actuator of the pump unit moves the journal in response to fluid pressure. A secondary pump of the pump unit feeds the actuator and includes a secondary hydraulic cylinder having a secondary piston, a track eccentrically supported within the housing, a follower element for engaging the track surface, and a plurality of valves for controllably feeding the hydraulic actuator. A counterweight is movably supported by the rotor and coupled by a rack and pinion mechanism for movement opposite to the journal. First and second hydraulic motors fluid connected in parallel to the main outlet of the main pump are adapted for differentially powering respective vehicle wheels. Also disclosed is a method for accelerating an inertial load using a rotating power source.

23 Claims, 5 Drawing Sheets

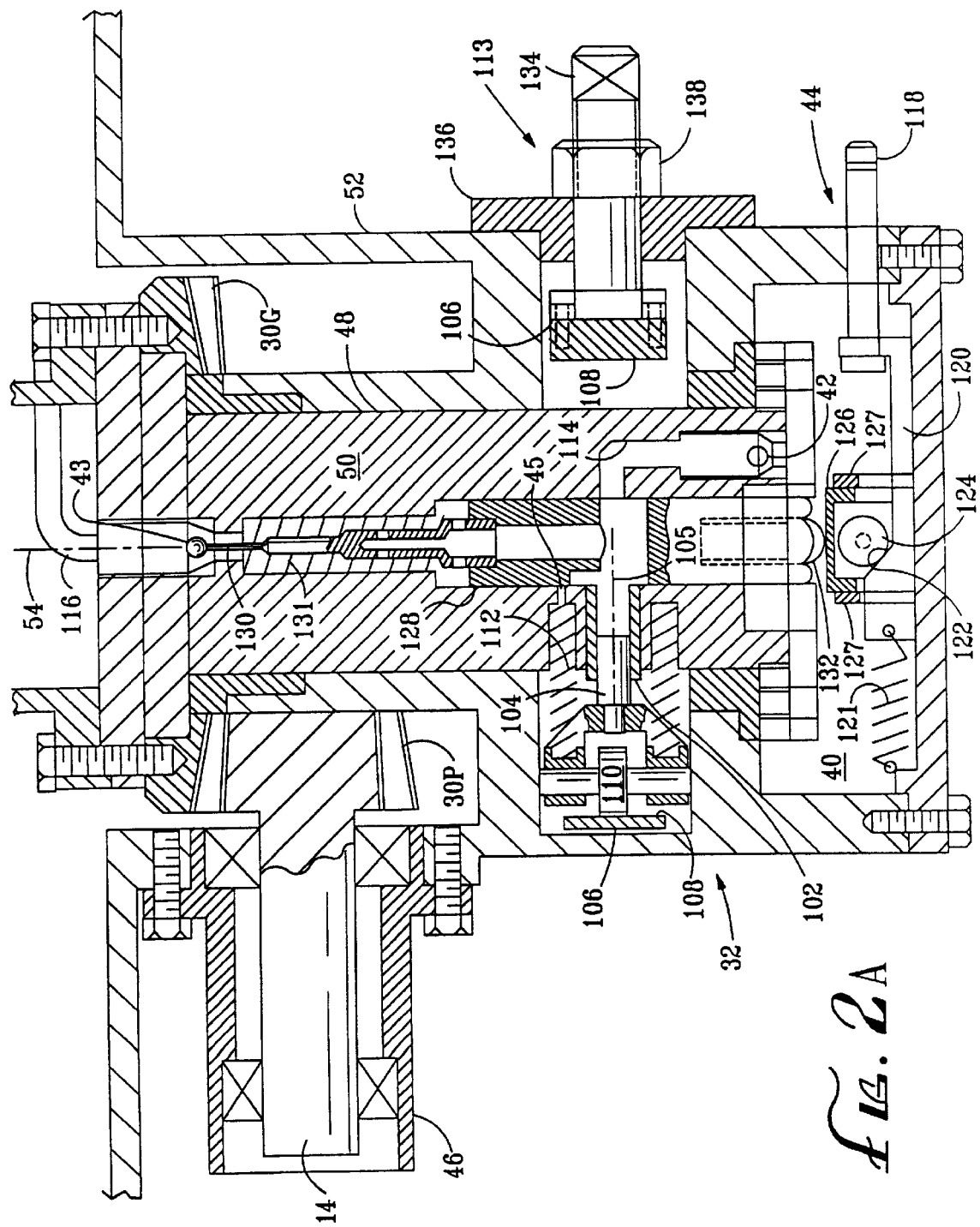

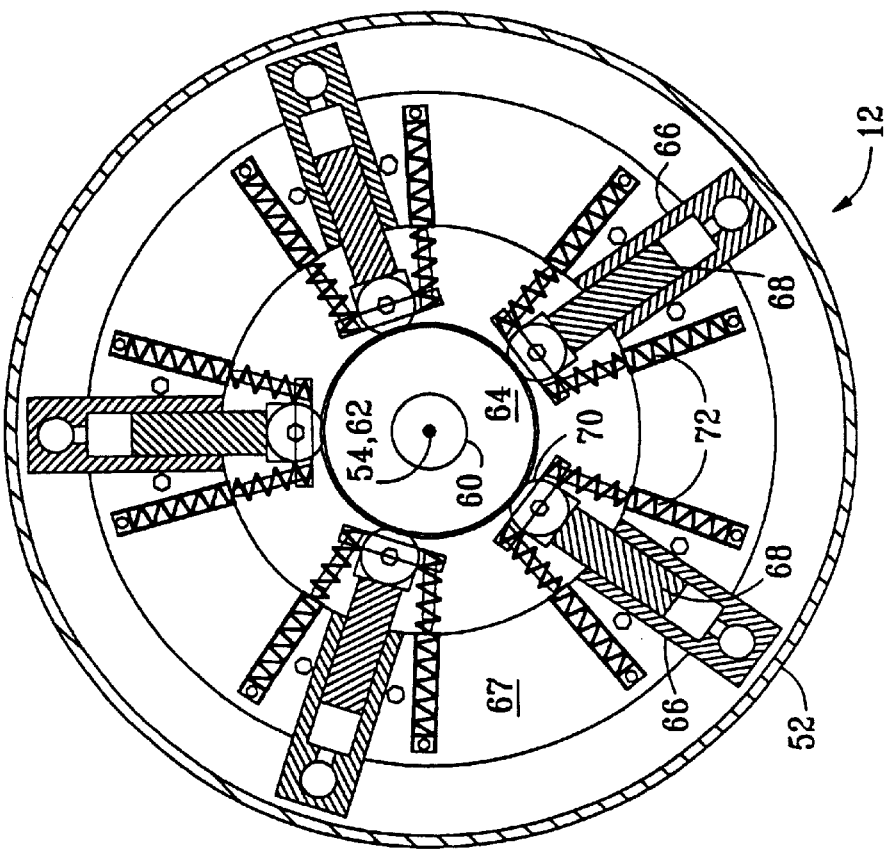
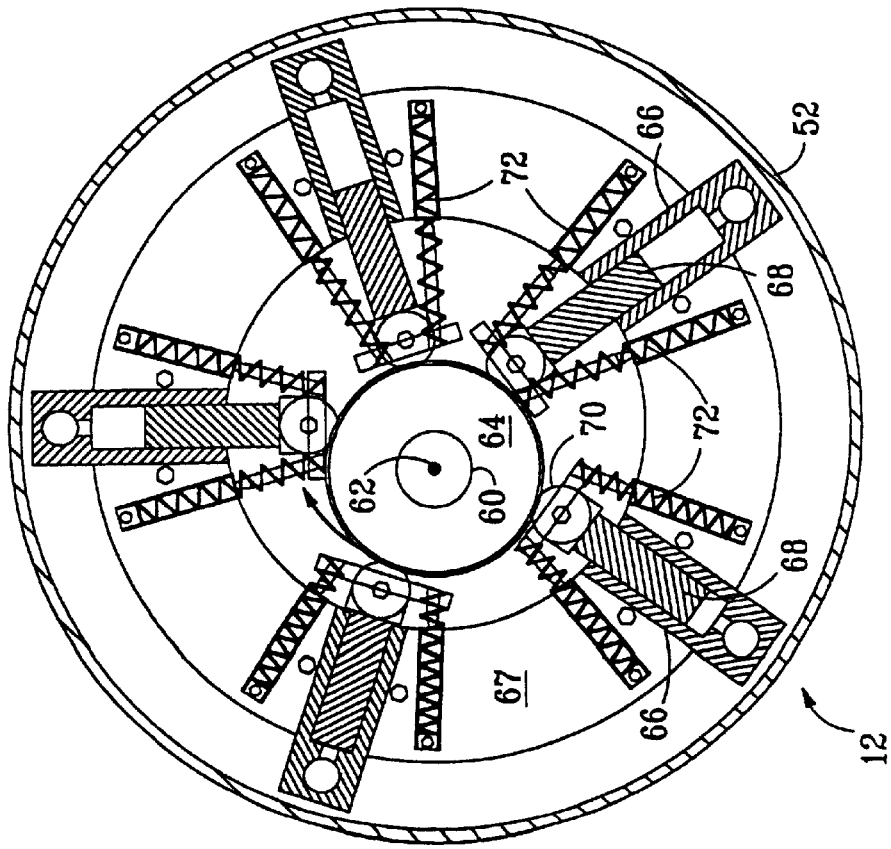

HYDRAULIC DRIVE SYSTEM

BACKGROUND

The present invention relates to hydraulic power transmission systems, and more particularly to a hydraulic drive incorporating a variable displacement pump for powering vehicles and the like.

Hydraulic vehicle drives including torque converters and hydraulicly shifted planetary gear trains are well known. Among the limitations of such drives is the requirement for mechanical shaft/housing continuity between an engine or other power source and driven wheels, which necessitates the use of universal joints and differential gearing, etc. Also, the range of torque multiplication is limited, useable ranges generally necessitating complex torque converter configurations and multiple ratio gear shifting systems that are expensive to provide, the efficiency of the combination being compromised by trade-offs relating to the complexity of the torque converter and the number of selectable gear ratios. For example, under a particular operating condition such as ascending a long grade, one selected ratio might provide insufficient drive wheel torque for maintaining a desired speed, whereas the next available ratio would result in undesirably high engine RPM. A further problem is that the braking systems of vehicles having automatic transmissions have greater wear and shorter life than those having manual transmissions that maintain a selected gear ratio during engine braking.

It is also known to use a positive displacement hydraulic pump that is driven, for example, by a battery powered electric motor, the pump being connected by suitable conduits to hydraulic motors that are coupled to wheels of a vehicle, one advantage being elimination of conventional drive shafts, universal joints, and differential gearing that are components of conventional vehicle drives. The use of electric motor power to the exclusion of internal combustion engines in such drives is dictated by the fixed turns ratio that exists between the positive displacement pump and the hydraulic motors. Actually, the use of such drives is substantially limited to special purpose vehicles such a fork-lifts and the like that operate within a very limited speed range, being preferably battery powered and having other justification for hydraulics, such as for the lift mechanism. Variable displacement hydraulic pumps are also known, but a principle disadvantage is that they are awkward to use in that adjusting the displacement is quite difficult, particularly under load.

Thus there is a need for a variable ratio drive system that overcomes the disadvantages of the prior art.

SUMMARY

The present invention meets this need by providing a continuously variable ratio hydraulic drive that us particularly effective in changing drive ratios under fully loaded conditions without requiring a complex actuator control system. In one aspect of the invention, a variable displacement hydraulic machine includes a main hydraulic pump having a rotary shaft input, and a control element being movable in a control path, the main pump having a displacement that is variable in response to positioning of the control element; a hydraulic actuator for moving the control element in the control path in response to fluid pressure; and a secondary pump for feeding the actuator, the secondary pump being rotatably coupled to the shaft input of the main pump for driving the secondary pump simultaneously with the main pump.

The main pump can include a main hydraulic cylinder, a piston sealingly slidable in the cylinder in response to rotation of the shaft input, and inlet and exhaust valves fluid coupled to the cylinder for admitting hydraulic fluid through the inlet valve and delivering the fluid through the exhaust valve under pressure when the piston reciprocates in the cylinder, the control element being coupled between the shaft input and the piston for adjusting an operating stroke of the piston. The inlet and exhaust valves can be one-way check valves. The main pump can further include a rotor member rotatably supported on a main rotor axis, the control element including a journal member movably supported on the rotor member at variable eccentricity relative to the main rotor axis in response to the hydraulic actuator, the stroke of the piston being related to the eccentricity of the journal member.

The journal member can move radially perpendicular to the main rotor axis, a counterweight preferaby being coupled to the journal member for radial movement oppositely to the journal member for balancing the rotor member notwithstanding the radial movement of the journal member. The coupling of the counterweight can utilize a journal rack fixedly supported relative to the journal member and a counterweight rack fixedly supported relative to the counterweight in facing relation to the journal rack, a pinion rotatably supported at a fixed location on the rotor member having geared engagement with the journal and counterweight racks for driving the counterweight oppositely from the movement of the journal member relative to the rotor member. The journal member is movable preferably from a first position being substantially concentric with the main rotor axis to a second position corresponding to a maximum stroke of the piston and a maximum displacement of the main pump, the first position producing substantially zero displacement of the main pump. The hydraulic actuator can include an actuator cylinder fixedly mounted to the main rotor, an actuator piston sealingly slidably engaging the actuator cylinder and being coupled to the journal member for movement thereof between first and second positions thereof. The actuator piston can move the journal member from the first position toward the second position in response to hydraulic pressure, the hydraulic actuator further comprising means for biasing the journal member toward the first position.

The main hydraulic cylinder can be one of a plurality of main hydraulic cylinders having counterparts of the piston and the inlet and exhaust valves, the main hydraulic cylinders being supported in circumferentially spaced relation about the control element, each of the pistons of the main pump being coupled to the control element for reciprocating movement thereby, the main pump having a main outlet in fluid communication with each of the exhaust valves. The control element can include a ring member having variable eccentric movement in response to rotation of the shaft input, each piston of the main pump being coupled to a follower member, each of the main hydraulic cylinders having means for biasing the corresponding piston toward the control element whereby the follower members maintain engagement with the ring member.

The main pump can be a positive displacement pump. The secondary pump can be a positive displacement pump. The secondary pump can include a secondary hydraulic cylinder having a secondary piston sealingly slidably movable therein on a piston axis and mounted for rotation on an axis transversely oriented relative to the piston axis in response to rotation of the shaft input; a track member having a track surface being non-concentric with the transversely oriented axis; a follower element for engaging the track surface and being coupled to the secondary piston for reciprocation thereof within the secondary cylinder during rotation during rotation thereof; and valve means for controllably feeding the hydraulic actuator in response to reciprocation of the secondary piston.

The valve means can include a secondary inlet valve having a first one-way check valve fluid connected between the secondary hydraulic cylinder and a reservoir of hydraulic fluid; an exhaust valve having a one-way check valve fluid connected between the secondary hydraulic cylinder and the hydraulic actuator; and a control member connected for controllably preventing closure of the one-way check valve of the exhaust valve. The secondary inlet valve can further include a control valve fluid connected in series with the first one-way check valve, the control valve being responsive to movement of the control member. The track surface can be circular, the track member being movably mounted relative to the transversely oriented axis for varying a stroke of the secondary piston, whereby the secondary pump is operable as a variable displacement pump. Preferably the hydraulic machine further includes an adjustable anchor for holding the track member in fixed relation to the transversely oriented axis.

A hydraulic drive system including the variable displacement hydraulic machine can be supplied in combination with a hydraulic motor being fluid connected to a main outlet of the main hydraulic pump. The hydraulic motor can be a first hydraulic motor, the system further including a second hydraulic motor being fluid connected in parallel with the first hydraulic motor, the hydraulic motors being adapted for differentially powering respective vehicle wheels.

In another aspect of the invention, a method for accelerating an inertial load using a rotating power source includes:
(a) fluid connecting a hydraulic motor to a pressure outlet of a variable displacement main pump having a hydraulic actuator coupled to a control element thereof, the control element being movable continuously from a minimum displacement position associated with inactivation of the hydraulic actuator to a maximum displacement position associated with full activation of the hydraulic actuator;
(b) rotatably connecting the hydraulic motor to the inertial load;
(c) fluid connecting a secondary pump to the hydraulic actuator; and
(d) simultaneously driving the main and secondary pumps from the power source, whereby the inertial load is accelerated initially at high mechanical advantage and subsequently at progressively reduced mechanical advantage as the control element moves from the minimum displacement condition toward the maximum displacement condition.

The hydraulic motor can be a first hydraulic motor, the method further including parallel fluid connecting a second hydraulic motor to the first hydraulic motor, the second hydraulic motor having a corresponding vehicle wheel rotatably coupled thereto.

DRAWINGS

These and other features, aspects, and advantages of the present invention will become better understood with reference to the following description, appended claims, and accompanying drawings, where:

FIG. 2A is an enlargement of a bottom portion of FIG. 2;

FIG. 3 is a plan sectional view of the system of FIG. 1 on line 3—3 of FIG. 2;

FIG. 3A is a sectional view as in FIG. 2, showing a main portion of the pump assembly in a maximum displacement condition.

DESCRIPTION

Figure 1:
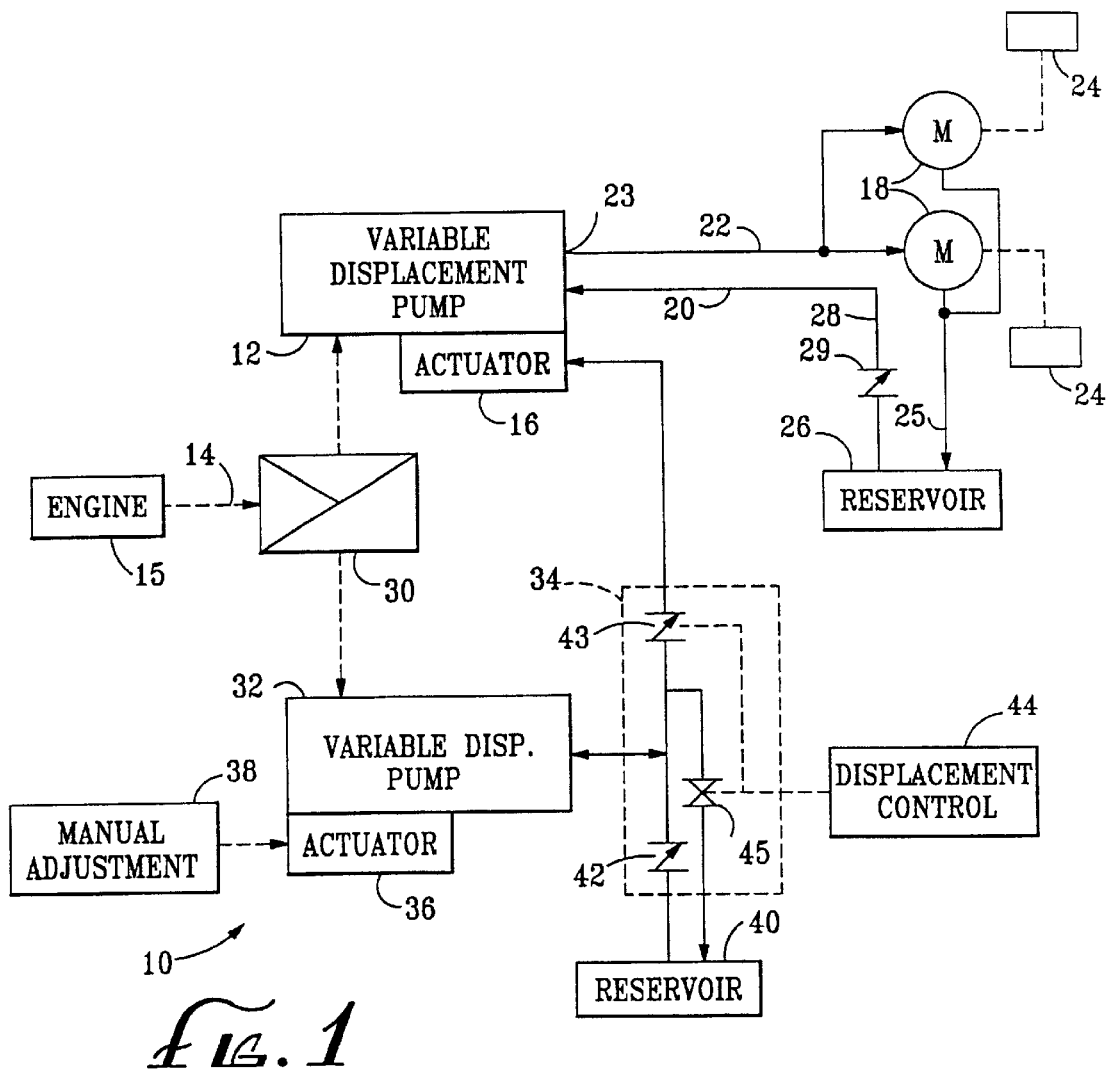
FIG. 1 is a pictorial view of a variable ratio hydraulic drive system according to the present invention.

The present invention is directed to a continuously variable hydraulic drive system that is particularly effective in powering a vehicle. With reference to FIG. 1 of the drawings, a hydraulic drive system 10 includes a variable displacement main pump 12 that is powered by an input shaft 14 from an engine 15 or other source of rotary mechanical power. The main pump 12 has a hydraulic primary actuator 16 for shifting the main pump over a continuous range of displacement conditions as described below for feeding a hydraulic drive motor 18 in a manner producing a desired ratio of rotational speeds of the motor 18 and the input shaft 14. It will be understood that a positive displacement hydraulic motor can also be used as a hydraulic pump by connecting its shaft to a source or rotational power instead of to a load. Thus the main pump 12 can in at least some implementations be used in other applications as a hydraulic motor, being designated more generally as a hydraulic machine. FIG. 1 shows the main pump 12 and the drive motor 18 connected in a recirculating fluid path 20 including a pressure conduit 22 connected between a main outlet 23 of the main pump 12 to the motor 18. Further, there is a pair of the motors 18 connected in parallel to the pressure conduit 22 for driving respective vehicle wheels 24. An outlet conduit 25 is also connected in parallel to the motors 18 for returning fluid to a main reservoir 26. Thus the vehicle wheels 24 are differentially driven by the hydraulic motors 18 whereby a conventional mechanical geared differential is not required. The fluid path 20 also includes a feed conduit 28 from the reservoir 26 to the pump 12, a one-way check valve 29 being connected in the feed conduit 28. It will be understood that other arrangements of the fluid path 20 are possible, including incorporation of a 4-way valve for reversing the direction of rotation of the motor 18. It is also contemplated that the main pump 12 may be configured for reversible fluid flow, either in response to an extended range of the actuator 16, by altering the operation of valves of the pump, or by using a bidirectional pump in combination with reversing gears between the engine 14 and the main pump 12.

The input shaft 14 is coupled through a right-angle gear drive 30 both to the main pump 12 and to a secondary pump 32 that can also be a variable displacement pump, the secondary pump 32 feeding the hydraulic actuator 16 through a control valve array 34. In an exemplary configuration, the secondary pump 32 is a variable displacement pump having a secondary actuator 36 and a mechanical adjustment 38 for the actuator 36. A secondary fluid reservoir 40 feeds the secondary pump 32 through a one-way valve 42 of the valve array 34, pressurized fluid flowing from the pump 32 through a one-way valve 43 of the valve array 34 to the actuator 16 by which the main pump 12 is shifted from a minimum displacement configuration toward a maximum displacement condition. In the exemplary configuration of FIG. 1, the control array 34 incorporates a one-way valve 43 between the secondary pump 32 and the actuator 16. Reverse fluid flow from the actuator 16 to the reservoir 40 is variably permitted through the control array 34 in response to a displacement control 44 that variably inhibits closure of the one-way valve 43. The displacement control 44 is also operates a drain valve 45 that provides a bypass path around the one-way valve 42 when the manual control is activated.

A principal feature of the present invention is that from a rest condition wherein the main pump 12 is in a minimum displacement condition, upon commencement of operation of the input shaft 14 following deactivation of the displacement control 44 the main pump 12 is gradually moved toward the maximum displacement condition by the primary actuator 16 in response to operation of the secondary pump 32. Consequently, the hydraulic motor 18 begins to move, slowly at first and at maximum mechanical advantage, the speed of the motor 18 increasing and the mechanical advantage smoothly decreasing in a programmed acceleration profile. The acceleration profile is nominally ramp-shaped when the input shaft 14 operating at constant speed, the slope of the ramp being responsive to the position of the actuator 36 as controlled by the mechanical adjustment 38. Also, operation of the displacement control 44 is effective for limiting or preventing further acceleration by inhibiting closure of the one-way valve 43 against the reverse flow, the primary pump 12 remaining in a constant displacement condition when flow from the secondary pump 32 is balanced by an equal amount of the reverse flow through the drain valve 45. Thus the ratio of rotational speeds between the input shaft 14 and the output of the hydraulic motor 18 is ultimately controlled by the displacement control 44, the ratio smoothly passing from high to lower mechanical advantage at a rate proportional to the speed of the input shaft 14 and the setting of the mechanical adjustment 38 except to the extent of reverse flow permitted by the displacement control 44.

Figure 2:
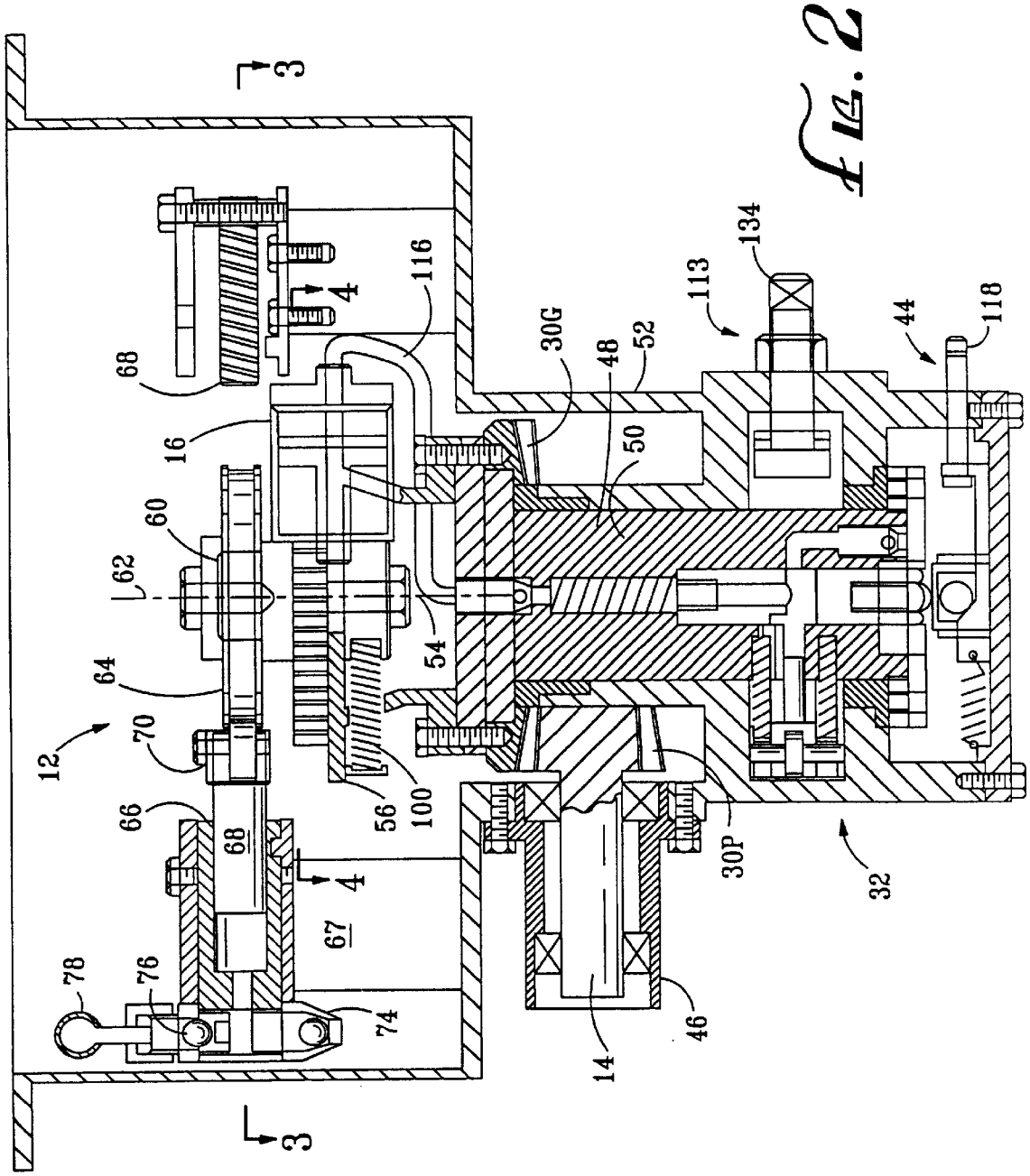
FIG. 2 is a side sectional elevational view of a variable displacement pump assembly of the system of FIG. 1, a main portion of the pump assembly being in a minimum displacement condition.
Figure 4:
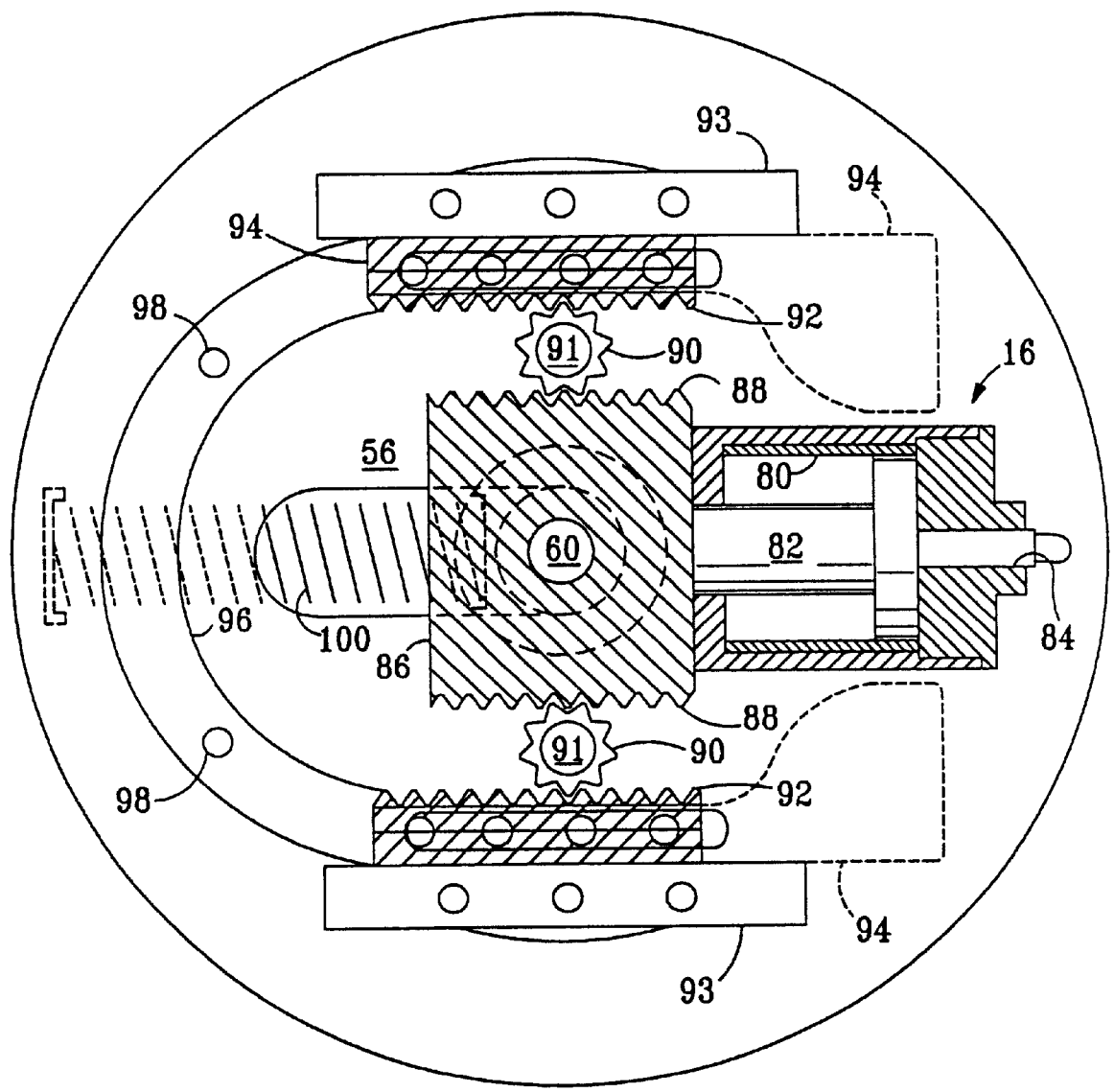
FIG. 4 is a plan sectional view of the system of FIG. 1 on line 4—4 of FIG. 2.

With further reference to FIGS. 2, 2A, 3, 3A, and 4, an exemplary implementation of the system 10 has the gear drive 30 including a pinion 30P formed on the input shaft 14 and rotatably mounted in a pinion housing 46 in a conventional manner, the pinion 30P engaging a bevel gear 30G that is fixably mounted to a rotor assembly 48, the rotor assembly 48 including a rotor shaft 50 that is rotatably mounted in a housing 52 on a vertically oriented rotor axis 54. The rotor assembly 48 also includes a rotor platform 56 that carries the hydraulic actuator 16 and a movable control element in the form of a journal member 60, the journal member 60 having a journal axis 62. The hydraulic actuator 16 is operable for displacing the journal axis 64 from a first position being substantially concentric with the rotor axis 54 as shown in FIGS. 2, 3, and 4 to a second position displaced therefrom as shown in FIG. 3A.

The main pump 12 includes a circular ring member 64 mounted on the journal member 60 concentric with the journal axis 62. A plurality of main hydraulic cylinders 66 are fixedly mounted to a base structure 67 of the main pump 12, the cylinders 66 being located in circumferentially spaced relation about the rotor axis 54, each of the cylinders 66 having a main piston 68 sealing slidable therein and having a roller follower 70 rotatably mounted thereto and having rolling contact with the ring member 64. A pair of main compression springs 72 are coupled between each piston 68 and the base structure 67 for biasing the pistons inwardly so that each piston 68 reciprocates within the corresponding cylinder 66 in response to eccentric movement of the ring member 64. Associated with each of the main hydraulic cylinders 66 is a fluid connected pair of one-way check valves, including an inlet check valve 74 and an exhaust check valve 76, respective outlets of the exhaust check valves 76 being parallel-connected by an outlet manifold 78. Hydraulic fluid is drawn into the cylinder 66 through the inlet check valve 74 in response to the movement of the piston 68 inwardly toward the rotor axis 54, outward movement of the piston 68 forcing by positive displacement the hydraulic fluid into the outlet manifold 78 through the exhaust check valve 76.

With particular reference to FIG. 4, the hydraulic actuator 16 includes an actuator cylinder 80 and an actuator piston 82 sealingly slidable therein, the cylinder 80 having a feed port 84 for receiving pressure fluid whereby the piston 82 is forcibly advanceable from the cylinder 80. The piston 82 is coupled to the journal member 60 by a journal block 86, the journal block 86 being slidably movable on the rotor platform 56 and having oppositely facing journal racks 88 formed thereon for engaging respective pinions 90 that are rotatably mounted on pinion pins 91 at fixed locations on the rotor platform 56. Each of the pinions 90 also has geared engagement with a counterweight rack 92, each rack 92 having a counterweight 94 rigidly connected thereto, the counterweight racks 92 and the counterweights 94 being slidably supported on opposite sides of the rotor platform 56. The counterweight racks 92 are also rigidly connected by a U-shaped member 96 which can have material selectively removed therefrom as indicated at 98 for further balancing of the assembly in a conventional manner. A compression spring 100 is interposed between a portion of the rotor platform and the journal member 60 for biasing the actuator 16 toward a retracted condition.

With no hydraulic pressure in the feed port 84, the spring 100 is effective for moving the counterweights 94 to an approximately centered position on opposite sides of the rotor axis 54, the journal member 60 and the actuator piston 82 being retracted by the geared engagement of the pinions 90 with the racks 88 and 92, the journal member 60 being also substantially concentric with the rotor axis 54, the actuator piston 82 being retracted within the actuator cylinder 80 as shown in FIG. 4. Pressure fluid entering the feed port 84 forcibly advances the actuator piston 82, simultaneously moving the journal member 60 and the journal axis 62 toward the second position depicted in FIG. 3A, the counterweights 94 being simultaneously oppositely moved for maintaining the rotor assembly 48 approximately balanced on the rotor axis 54 throughout the range of movement of the journal member 60 relative to the rotor platform 56. Accordingly, the hydraulic actuator 16 is effective for positioning the journal member 60 between the first position thereof for providing a first displacement of the main pump 12 being substantially zero and the second position corresponding to a maximum displacement of the main pump 12. It will be understood that the first position can be offset from the rotor axis 54 such that the minimum displacement is greater than zero. However, the inclusion of zero displacement in the range of positions of the journal member 60 is preferred in that the engine 15 can continue to run with the (vehicle) load remaining at rest, without requiring a conventional clutch in the drive system.

With particular reference to FIGS. 1 and 2A, the secondary pump 32 includes a secondary hydraulic cylinder 102 having a secondary piston 104 sealingly slidable therein on a piston axis 105, the secondary hydraulic cylinder 102 being mounted to the rotor shaft 50 with the piston axis 105 perpendicularly intersecting the rotor axis 54. A track member 106 having a circular track surface 108 is adjustably mounted in the housing 52 with the track surface 108 eccentrically offset from the rotor axis 54. A roller follower 110 of the secondary piston 104 contacts the track surface 108 for displacing the secondary piston 104 to the extent of the eccentricity of the track surface 108 in response to rotation of the rotor assembly 48, a pair of secondary compression springs 112 biasing the roller follower 110 outwardly against the track surface 108. The track member 106 is anchored to the housing 52 by an adjuster assembly 113. The track member 106, the roller follower 110 and the secondary compression springs 112 function as the secondary actuator 36 of FIG. 1. The one-way valve 42 is fluid connected in the rotor shaft 50 to the secondary cylinder 102 and the reservoir 40 that is formed at the bottom of the housing 52, an inlet passage 114 being formed in the rotor shaft 50. The secondary cylinder 102 is also fluid connected through a conduit 116 to the hydraulic actuator 16, the conduit 116 having a bottom extremity entering the rotor assembly 48, the one-way valve 43 being located within an upper extremity of the rotor shaft 50 for blocking reverse flow of hydraulic fluid from the actuator 16, except as permitted by the displacement control 44 as described herein. The displacement control 44 includes a control member 118 that projects from the housing 52 for movement by external means (not shown), the control member 118 being fastened to a cam member 120 that is transversely slidable within the housing 52 between first and second positions thereof. The control member 118 is biased inwardly by an extension spring 121 that is connected between the cam member 120 and the housing 52. A ramp portion 122 of the cam member 120 is coupled by a roller 124 to a shell member 126 that is vertically guided between a pair of control guides 127 that are oriented orthogonally to the control member 118. The control guides 127 are also formed for guiding the control member 118, the shell member 126 straddling the control member 118 and being further guided thereby. The shell member 126 imparts vertical movement to a control rod 128 that is vertically slidable on the rotor axis 54 within the rotor shaft 50. An upper portion of the control rod 128 forms a prong 130 for preventing closure of the one-way valve 43 when the control rod 128 is raised from its bottom rest position by outward movement of the control member 118 being coupled through the roller 124 as described above. The control rod 128 is biased downwardly toward the shell member 126 by a compression spring 131. A bottom extremity of the control rod 128 has a hardened ball member 132 mounted thereto for making small area contact with the shell member 126 whereby the control rod 128 is free to rotate with the rotor assembly 48 without appreciable drag or wear from contact with the shell member 126.

The inlet passage 114 has fluid communication with the secondary hydraulic cylinder 102 through the control rod 128, the drain valve 45 being formed by an enlargement of the passage through the control rod 128 uncovering a drain passage of the rotor shaft 50 that opens within one of the secondary compression springs 112 when the control rod 128 moves upwardly. The adjuster assembly 113 includes a threaded post 134 that is rigidly fastened to the track member 106, projecting through a track plate 136 that is fastened to an outside surface of the housing 52, the post 134 also threadingly engaging a lock nut 138, adjustment of the post 134 and the lock nut 138 effecting lateral translation of the track member 106 within the housing 52 as desired to achieve a predetermined positive displacement of the secondary pump 32. Assembly of the track member 106 into the housing 52 is facilitated by inserting the track member with the post 134 and the plate 136 attached thereto prior to installing the rotor assembly 48.

As indicated above, the adjuster assembly 113 effects adjustment of the displacement of the secondary pump 32, thereby setting a rate of advancement of the displacement of the main pump 12 per revolution of the rotor assembly 48, which corresponds to a preset acceleration envelope of the vehicle wheels 24 at a given rotational speed of the input shaft 14. Operation of the control member 118 progressively produces reduced acceleration, no acceleration, and deceleration, deceleration occurring when flow through the drain valve 45 exceeds the flow through the one-way valve 42. Thus it is contemplated that the control member 188 be responsively connected to a vehicle braking system for enhanced effectiveness of the drive system 10 in using the engine 15 to assist the vehicle braking system.

Thus the present invention provides a method for accelerating an inertial load using a rotating power source by fluid connecting a pair of the hydraulic motors 18 in parallel to the main outlet 23 of the main pump 12 having the hydraulic actuator 16 coupled to the journal member 60 thereof, the journal member 60 being movable continuously from a minimum displacement position associated with inactivation of the hydraulic actuator 16 to a maximum displacement position associated with full activation of the hydraulic actuator 16. The method also includes rotatably connecting the hydraulic motors 18 to respective vehicle wheels 24, fluid connecting the secondary pump 32 to the hydraulic actuator 16, and simultaneously driving the main and secondary pumps 12 and 32 from the engine 15, whereby the vehicle wheels 24 are accelerated initially at high mechanical advantage and subsequently at progressively reduced mechanical advantage as the journal member 60 moves from the minimum displacement condition toward the maximum displacement condition.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A variable displacement hydraulic machine comprising:
   (a) a main hydraulic pump having a rotary shaft input, and a control element being movable in a control path, the main pump having a displacement that is variable in response to positioning of the control element;
   (b) a hydraulic actuator for moving the control element in the control path in response to fluid pressure; and
   (c) a variable displacement secondary pump for feeding the actuator, the secondary pump being rotatably coupled to the shaft input of the main pump for driving the secondary pump simultaneously with the main pump.

2. The hydraulic machine of claim 1, wherein the main pump comprises a main hydraulic cylinder, a piston sealingly slidable in the cylinder in response to rotation of the shaft input, and inlet and exhaust valves fluid coupled to the cylinder for admitting hydraulic fluid through the inlet valve and delivering the fluid through the exhaust valve under pressure when the piston reciprocates in the cylinder, the control element being coupled between the shaft input and the piston for adjusting an operating stroke of the piston.

3. The hydraulic machine of claim 2, wherein the inlet and exhaust valves are one-way check valves.

4. The hydraulic machine of claim 2, wherein the main pump further comprises a rotor member rotatably supported on a main rotor axis, the control element comprising a journal member movably supported on the rotor member at variable eccentricity relative to the main rotor axis in response to the hydraulic actuator, the stroke of the piston being related to the eccentricity of the journal member.

5. The hydraulic machine of claim 4, wherein the journal member moves radially perpendicular to the main rotor axis, a counterweight being coupled to the journal member for radial movement oppositely to the journal member.

6. The hydraulic machine of claim 5, further comprising a journal rack fixedly supported relative to the journal member and a counterweight rack fixedly supported relative to the counterweight in facing relation to the journal rack, and a pinion rotatably supported at a fixed location on the rotor member, the pinion having geared engagement with the journal and counterweight racks for driving the counterweight oppositely from the movement of the journal member relative to the rotor member.

7. The hydraulic machine of claim 4, wherein the journal member is movable from a first position being substantially concentric with the main rotor axis to a second position corresponding to a maximum stroke of the piston and a maximum displacement of the main pump, the first position producing substantially zero displacement of the main pump.

8. The hydraulic machine of claim 4, wherein the hydraulic actuator comprises an actuator cylinder fixedly mounted to the rotor member, an actuator piston sealingly slidably engaging the actuator cylinder and being coupled to the journal member for movement thereof between first and second positions thereof.

9. The hydraulic machine of claim 8, wherein the actuator piston moves the journal member from the first position toward the second position in response to hydraulic pressure, the hydraulic actuator further comprising means for biasing the journal member toward the first position.

10. The hydraulic machine of claim 2, wherein the main hydraulic cylinder is one of a plurality of main hydraulic cylinders having counterparts of the piston and the inlet and exhaust valves, the main hydraulic cylinders being supported in circumferentially spaced relation about the control element, each of the pistons of the main pump being coupled to the control element for reciprocating movement thereby, the main pump having a main outlet in fluid communication with each of the exhaust valves.

11. The hydraulic machine of claim 10, wherein the control element comprises a ring member having variable eccentric movement in response to rotation of the shaft input, each piston of the main pump being coupled to a follower member, each of the main hydraulic cylinders having means for biasing the corresponding piston toward the control element whereby the follower members maintain engagement with the ring member.

12. The hydraulic machine of claim 1, wherein the main pump is a positive displacement pump.

13. The hydraulic machine of claim 1, wherein the secondary pump is a positive displacement pump.

14. The hydraulic machine of claim 1, wherein the secondary pump comprises:
(a) a secondary hydraulic cylinder having a secondary piston sealingly slidably movable therein on a piston axis, the secondary hydraulic cylinder being mounted for rotation on an axis transversely oriented relative to the piston axis in response to rotation of the shaft input;
(b) a track member having a track surface being non-concentric with the transversely oriented axis;
(c) a follower element for engaging the track surface, the follower element being coupled to the secondary piston for reciprocation thereof within the secondary cylinder during rotation during rotation thereof; and
(d) valve means for controllably feeding the hydraulic actuator in response to reciprocation of the secondary piston.

15. The hydraulic machine of claim 14, wherein the valve means comprises:
(a) a secondary inlet valve comprising a first one-way check valve fluid connected between the secondary hydraulic cylinder and a reservoir of hydraulic fluid;
(b) an exhaust valve comprising a one-way check valve fluid connected between the secondary hydraulic cylinder and the hydraulic actuator; and
(c) a control member connected for controllably preventing closure of the one-way check valve of the exhaust valve.

16. The hydraulic machine of claim 15, wherein the secondary inlet valve further comprises a control valve fluid connected in series with the first one-way check valve, the control valve being responsive to movement of the control member.

17. The hydraulic machine of claim 14, wherein the track surface is circular, the track member being movably mounted relative to the transversely oriented axis for varying a stroke of the secondary piston, whereby the secondary pump is operable as a variable displacement pump.

18. The hydraulic machine of claim 17, further comprising an adjustable anchor for holding the track member in fixed relation to the transversely oriented axis.

19. A hydraulic drive system comprising the variable displacement hydraulic machine of claim 1 in combination with a hydraulic motor being fluid connected to a main outlet of the main hydraulic pump.

20. The hydraulic drive system claim 19, wherein the hydraulic motor is a first hydraulic motor, the system further comprising a second hydraulic motor being fluid connected in parallel with the first hydraulic motor, the hydraulic motors being adapted for differentially powering respective vehicle wheels.

21. A hydraulic drive system comprising:
(a) a variable displacement pump unit having a housing and a main outlet, a rotor member rotatably supported within the housing on a main rotor axis, and an input shaft coupled to the rotor member by mating bevel reduction gears;
(b) a main pump of the pump unit having a positive displacement that is variable in response to positioning of a control element, the main pump comprising:
(i) a plurality of main hydraulic cylinders, the main hydraulic cylinders being fixedly supported relative to the housing in circumferentially spaced relation about the main rotor axis;
(ii) a journal member supported on the rotor member and having a ring member concentrically mounted thereto on a journal axis, the journal member being radially movable at variable eccentricity of the journal axis relative to the main rotor axis;
(iii) a counterweight supported by the rotor member for radial movement oppositely to the journal member for maintaining balancing of the rotor member notwithstanding radial movement of the journal member, the counterweight being coupled to the journal member by a journal rack fixedly supported relative to the journal member and a counterweight rack fixedly supported relative to the counterweight in facing relation to the journal rack, and a pinion rotatably supported at a fixed location on the rotor member, the pinion having geared engagement with the journal and counterweight racks for driving the counterweight oppositely from the movement of the journal member relative to the rotor member;

(iv) a plurality of pistons sealingly slidable in corresponding ones of the cylinders, each of the pistons of the main pump being coupled to the shaft input by the ring member and the journal member for reciprocating movement, an operating stroke of the pistons being defined by the eccentricity of the journal axis relative to the rotor axis, the journal member being movable from a first position being substantially concentric with the main rotor axis to a second position corresponding to a maximum stroke of each piston and a maximum displacement of the main pump, the first position producing substantially zero displacement of the main pump; and (v) inlet and exhaust one-way check valves fluid coupled to each of the cylinders for admitting hydraulic fluid through the inlet valves and delivering the fluid through the exhaust valves under pressure when the pistons reciprocate in the corresponding cylinders, each of the exhaust valves being in fluid communication with the main outlet;

(c) a hydraulic actuator of the pump unit for moving the journal member in a control path in response to fluid pressure, comprising an actuator cylinder fixedly mounted to the main rotor, an actuator piston sealingly slidably engaging the actuator cylinder and being coupled to the journal member for movement thereof between the first and second positions thereof, and a spring for biasing the journal member toward the first position;

(d) a secondary pump of the pump unit for feeding the actuator, comprising:

(i) a secondary hydraulic cylinder having a secondary piston sealingly slidably movable therein on a piston axis, the secondary hydraulic cylinder being supported on the main rotor with the piston axis perpendicular to the rotor axis;

(ii) a track member supported within the housing and having a track surface being non-concentric with the rotor axis;

(iii) a follower element for engaging the track surface, the follower element being coupled to the secondary piston for reciprocation thereof within the secondary cylinder during rotation during rotation thereof; and (iv) a plurality of valves for controllably feeding the hydraulic actuator in response to reciprocation of the secondary piston for advancing the journal member toward the second position, including a secondary inlet valve having a first one-way check valve fluid connected between the secondary hydraulic cylinder and a reservoir of hydraulic fluid, and an exhaust valve having a one-way check valve fluid connected between the secondary hydraulic cylinder and the hydraulic actuator, a control member being connected for controllably preventing closure of the one-way check valve of the exhaust valve for selectively limiting the advancement of the journal member and permitting return of the journal member toward the first position; and (e) first and second hydraulic motors fluid connected in parallel to the main outlet of the main pump, the hydraulic motors being adapted for differentially powering respective vehicle wheels.

22. A method for accelerating an inertial load using a rotating power source, comprising:

(a) fluid connecting a hydraulic motor to a pressure outlet of a variable displacement main pump having a hydraulic actuator coupled to a control element thereof, the control element being movable continuously from a minimum displacement position associated with inactivation of the hydraulic actuator to a maximum displacement position associated with full activation of the hydraulic actuator;

(b) rotatably connecting the hydraulic motor to the inertial load;

(c) fluid connecting a secondary variable displacement pump to the hydraulic actuator; and (d) simultaneously driving the main and secondary pumps from the power source, whereby the inertial load is accelerated initially at high mechanical advantage and subsequently at progressively reduced mechanical advantage as the control element moves from the minimum displacement condition toward the maximum displacement condition.

23. The method of claim 22, wherein the hydraulic motor is a first hydraulic motor, the method further comprising parallel fluid connecting a second hydraulic motor to the first hydraulic motor, the second hydraulic motor having a corresponding vehicle wheel rotatably coupled thereto.

* * * * *